United States Patent Office 3,197,361
Patented July 27, 1965

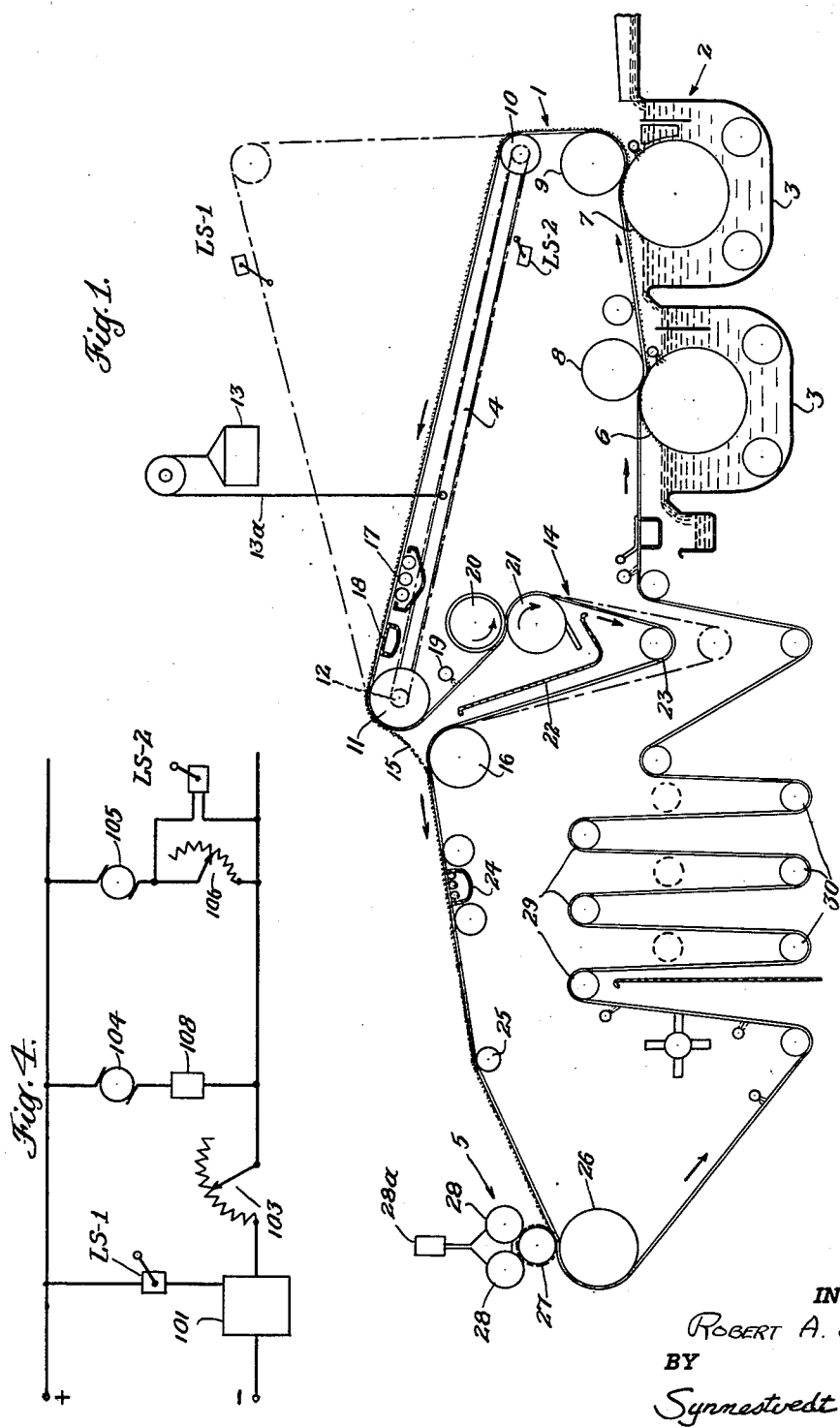

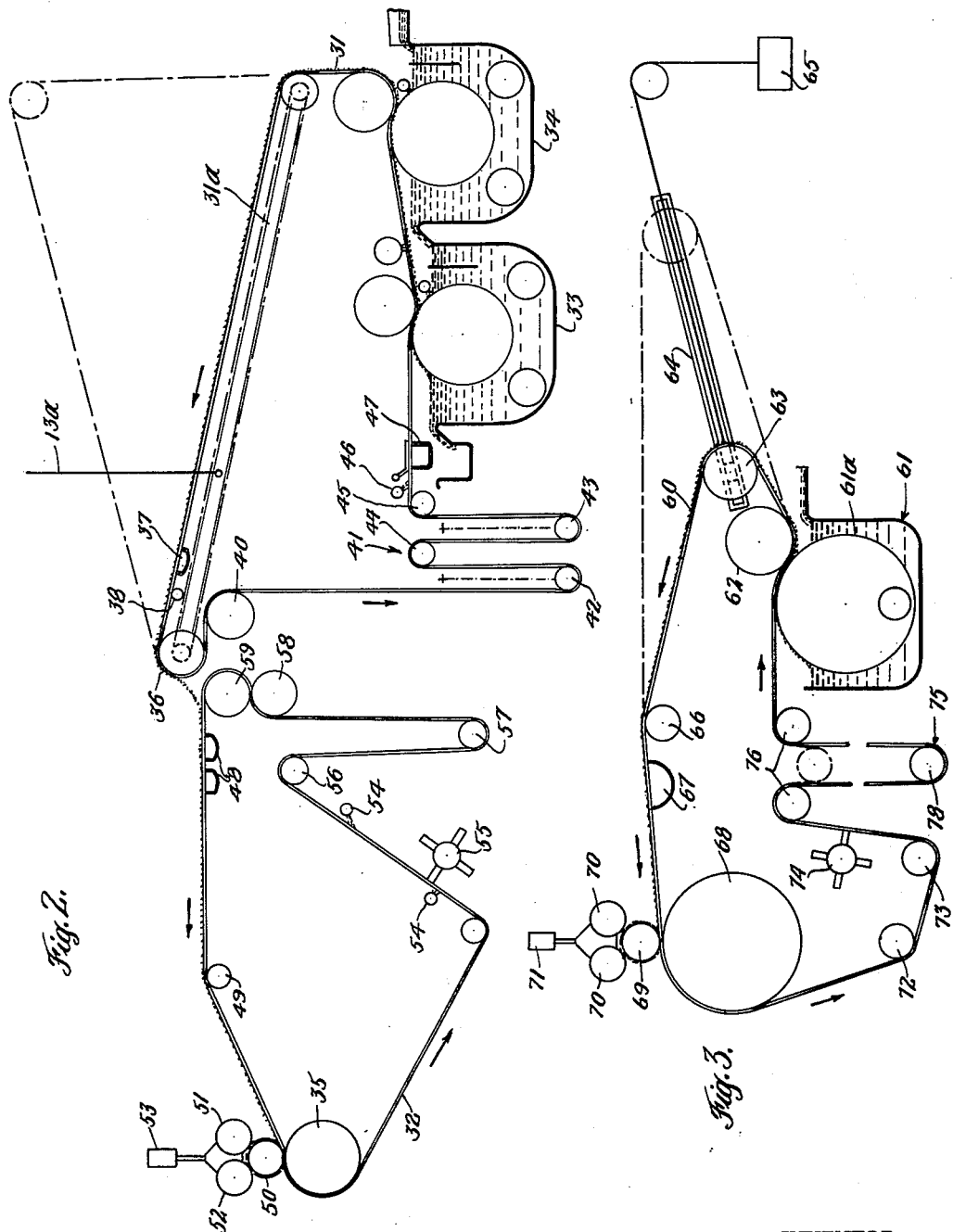

3,197,361
APPARATUS FOR TRANSFERRING A FIBROUS CEMENT WEB FROM A FORMING STATION TO A TUBE WINDING STATION
Robert A. Schneider, Fort Washington, Pa., assignor to Certain-Teed Products Corporation, Ardmore, Pa., a corporation of Maryland
Filed May 28, 1963, Ser. No. 283,773
14 Claims. (Cl. 162—284)

This invention relates to the manufacture of articles from cementitious materials and is applicable to the making of a wide variety of articles from such materials. Certain aspects of the invention are of a special usefulness in the manufacture of hollow bodies such as pipes and tubing and for illustrative purposes the invention is herein described and illustrated as applied to equipment for producing pipes and tubing.

In a system for making pipes or tubing, cementitious material, preferably a slurry of fibrous material with cement as a binder, is formed into a web and, after removal of most of the water, the web is wound on a rotating mandrel. As applied to a system for making pipes and tubing, the invention is particularly concerned with improvements in the technique for transferring the web to the rotating mandrel.

As above noted, pipes and tubing of asbestos cement or similar types of material are conventionally made by producing a web or lamination of the material and transferring this web to a rotating mandrel. The web is wrapped upon the mandrel until the desired pipe thickness is reached. The mandrel is removed, replaced by another and the operation is repeated.

In conventional practice, the foregoing is accomplished by rotating cylinder molds partially immersed in vats of the material to be used. These cylinder molds pick up and form a web of the material and transfer it to an endless conveyor belt. A conveyor belt made from a porous material such as felt is used so that the web will adhere to the belt and so as to facilitate water removal by various extraction devices. The felt conveyor transfers the web of material to the rotating mandrel where the pipe is manufactured. In the past when the mandrel with the rolled-up web is interchanged with a new mandrel it has been the usual practice to shut down the machine, including the rotating cylinder mold. During this shut-down time, filtration of the slurry by the cylinder mold diminishes, and a thicker layer of asbestos cement material accumulates on its surface. This thicker layer contains a significantly larger amount of moisture and does not have as good dispersion of the asbestos fibers as does a web made when the cylinder mold is rotating, so that the web fed to the mandrel is not uniform. The pipe produced from web material including such nonuniform portions, has been found to be of inferior quality. Moreover the higher moisture content limits the speed of operation of the apparatus as will appear more fully hereinafter.

In machines of this type, production of best quality pipe is dependent to a large extent upon the pressure which is applied by press rolls which bear on the web as it is wrapped up on the mandrel. If the pressure is set at the optimum level for proper pipe formation and removal of moisture from the thinner portion of the web, the thicker web portion will be subjected to such excessive pressure by these press rolls that it is likely to be broken. Moreover, the large amount of moisture in this thicker portion of the web will be expressed with such force that it will crush and tear the lamination.

On the other hand, if the pressure exerted by these rolls is so set that the thicker lamination is not damaged, the proper amount of moisture will not be removed from the thinner portion of the web and the pipe so formed will be of inferior quality.

While it is theoretically possible to automatically vary the pressure as the web thickness changes, this is impractical for a variety of reasons. Complex and costly control systems are necessary to accurately vary the pressure. If a higher pressure is exerted on the outer laminations of a partially rolled up pipe, this will tend to expel moisture from the inner layers. The water so extracted will spiral along the interfaces of the rolled up web, delaminating or completely rupturing the pipe. Moreover, even if such an approach were practical, it would not overcome the aforementioned problems of poor fiber dispersion and lack of uniformity in the thickness of the lamination.

Hence, it can be seen that it is desirable to continue to rotate the cylinder molds during the mandrel change period so that a uniform web is produced. Various systems have in fact been tried employing this principle, but in practice have not been entirely satisfactory for a variety of reasons. One such system utilizes a magazine containing a plurality of mandrels, so that a change of mandrels may be more rapidly effected; another system uses two mandrel stations and alternately feeds the web of material from one mandrel to the other. Both of these approaches are inefficient in that they waste time or material. The latter is undesirable due to the costly and complex control mechanisms necessary to cause the alternating operation.

Yet a third system contemplates lifting the web of material off the felt while the mandrel is being changed. When a fresh mandrel is in position, the material picked up is fed to the mandrel as a double lamination. This approach also requires complex and expensive control mechanisms to vary the pressure applied to the web by the press-rolls and introduces problems of pipe delamination and rupture inherent in a variable pressure system.

Accordingly, it is an object of this invention to provide simple and efficient means for increasing the quality of pipe formed over that obtained by prior art machines of the type described.

Another object is to increase the production capacity of the pipe-making machine without the normal sacrifices of quality inherent in the prior art.

A more specific object of the present invention is to provide means for transferring a web of fibrous material to a pipe-forming mandrel in a manner permitting the continuous operation of the cylinder mold.

In accordance with this invention these and other objects are achieved by an apparatus having a mandrel drive mechanism which is adapted to sequentially receive and rotate a plurality of mandrels. Mechanism is provided for continually forming a web of fibers from a slurry of material and further includes a conveyor to transfer the fiber web from the web-forming mechanism to the mandrels. The arrangement includes a drive mechanism for the conveyor consisting of continuously operatable means for driving the conveyor in the region where the conveyor receives the fiber web from the web-forming mechanism, and discontinuously operatable means for driving the fiber web in the region of the mandrels to provide for cessation of web feed during the change of mandrels. It further includes a slack accumulator for the conveyor which extends the path of travel of the conveyor when the discontinuously operatable drive means is stopped to effect a mandrel change.

How the foregoing and other objects and advantages of the invention are achieved will be clear from the description which follows hereinbelow and from the figures on the accompanying drawings in which:

FIGURE 1 is a schematic view showing a preferred form of the invention;

FIGURE 2 is a showing of an alternative embodiment of the invention;

FIGURE 3 is a view of yet a third embodiment of this invention; and

FIGURE 4 illustrates in schematic form, a control circuit for use in carrying out the invention.

Referring now to FIGURE 1 of the drawings, an embodiment is shown in which a single continuous conveyor element 1 extends from a first material transfer station or cylinder mold section 2, over a pivoted carriage 4 to a second material transfer station or mandrel roll-up section 5 where the material is formed into pipe. Vats 3 at the cylinder mold section of the apparatus contain a slurry of cement and asbestos. Cylinder molds 6 and 7, driven by constantly operating drive means, are partially immersed in the slurry. The continuous conveyor element 1 is conventionally made of felt or other flexible, porous material and passes over and is driven by the cylinder molds. The slurry is picked up by the cylinder molds, which filter out a portion of the water, thereby forming a web which is applied to the conveyor element 1. Couch rolls 8 and 9 extract some of the water from the web and thereby transfer the web from the cylinder molds 6 and 7 to the conveyor element, an effect known in the art as couching. The couch rolls 8 and 9 also serve to guide the felt conveyor element over the cylinders and to compress the web of material applied.

As the conveyor element passes the cylinder mold section of the apparatus it moves upwardly around the second couch roll 9 and then over idler roll 10 which is mounted on a swinging carriage 4. Carriage 4 constitutes a slack accumulator as will be described subsequently. The element follows a path extending along the carriage until it passes over a driven roll 11. The carriage 4 is pivoted at the point 12 and is provided with a counter-balancing means such as a weight 13 connected with cable 13a. This weight is of such magnitude that it counter-balances the carriage and all attachments and in addition, is designed to exert a pull on the felt conveyor element between the roll 9 and the roll 11, causing the carriage to pivot and thereby to extend the path that the conveyor element travels, whenever the tension in the felt drops below a predetermined level. The weight 13 is shown merely by way of example. Other pneumatic, spring, or similar counter-balancing means could be employed.

After passing over the roll 11, the conveyor element follows a downwardly extending looping path 14. At this point means are provided to temporarily separate the web of material from the conveyor element, as is shown at 15 in FIGURE 1. The separated web is dropped onto the belt when it passes up over the roll 16. The loop of material-free belt which this arrangement creates may be treated to remove water without hampering the quality of the web of material.

In the illustrative embodiment, the apparatus to accomplish this includes suction box 17 and air blowing slot 18 mounted on the carriage 4 immediately adjacent the material transfer point. Suction box 17 removes enough water from the web or lamination of material so that it is of such a consistency that it will separate from the felt when it passes over the air slot 18. The air from slot 18 gently lifts the partially dried lamination from the felt so that when it passes over the roll 11 and begins its downward path, the material readily drops onto the felt on roll 16.

In order to remove the water from the downwardly extending loop, a shower or washing device 19 is provided to spray water on the felt intermediate rolls 11 and 20. The felt then passes between the rolls 20 and 21 which are squeezed together by hydraulic or other force-applying means in a known manner. The pressure between these rolls 20 and 21 is adjusted so that virtually all the moisture extractable from the felt is removed at this point. A baffle 22 is provided adjacent the shower 19 and pressure rolls 20 and 21 to shield the return run of the felt from the water removed. A felt tensioning device such as a weighted counter-roll 23 guides and takes up any slack appearing in the dried belt, as indicated by the full and dot-dash line positions shown.

The conveyor element 1 next passes over the roller 16, which is located a slight distance below and to the left of roller 11 in FIGURE 1. As described above, the web of material is deposited on the dried belt at this point and is subsequently carried thereby to the mandrel section of the machine.

Intermediate the roll 16 and the mandrel station 5, a suction box 24 is disposed beneath the belt. This box tends to hold the lamination to the belt and removes additional moisture from the lamination and the belt. After passing this box and a guide roll 25, the felt passes over a driven roller 26. A mandrel such as 27 is placed between counterpress rolls 28 and the conveyor element where it engages driven roll 26. As the roll 26 drives the felt conveyor element past the mandrel 27, the web of material is wrapped up on the mandrel.

By removing the water from the felt in advance of the station where the web is wrapped on the mandrel, especially by the action of rolls 20 and 21, an important limitation on the speed of operation of prior art machines is removed. In machines of this type, the speed is limited by the amount of water that can be removed per unit of time without creating an excessive hydraulic pressure in the felt. These excessive pressures must be avoided since they will rupture the web of material. In these prior art machines the felt normally contains considerable water, in fact more than the supported lamination when it comes from the vat section. By removing virtually all of this water from the felt in accordance with the practices of this invention, the amount of water to be removed per unit of time from the sandwiched web-felt is decreased to such an extent that the speed of operation may be increase by 100 percent or even more without rupturing the web.

In furtherance of the present invention, means are provided to stop the driven rolls 26 and 11, independently of the cylinder mold drive means, so that the lamination is not fed to the roll-up section while the mandrels are being exchanged. In the return run of the felt, intermediate the drive roll 26 and the cylinder mold section 2, the length of the path of travel of the belt is made variable through the use of a festoon arrangement comprising a plurality of fixed rolls 29 and a plurality of vertically movable counter-weighted rolls 30 as shown in FIGURE 1. The counter-weighted rolls are adapted to move from the full line position to the dotted line position shown in the figure as the length of the belt in the return portion of the path varies. Conventional showers, beaters, and blowers are provided in the return run to further clean the belt before it returns to the vat section of the apparatus.

When a pipe of the desired thickness has been formed on a mandrel 27, the operator stops the independently operatable drive means which drives the rolls 11 and 26 in order to replace the mandrel. At this time, the counterpress rolls 28 are lifted by the lifting member diagrammatically indicated at 28a, thus permitting release of one mandrel and replacement of another. Since the cylinder molds are continuously driven, the excess felt in the return run is fed over the cylinder molds, thus providing for continuous web formation. As this felt is fed past the second cylinder mold 7, the tension intermediate the couch roll 9 and the roll 11 tends to relax, but counter-weight 13 causes carriage 4 to pivot upwardly about the point 12, for instance to the position shown in dot-dash lines, thus maintaining a substantially constant tension on the felt and causing it to follow a uniform path of increasing length.

When a fresh mandrel is properly positioned, the operator starts up the drive means at the mandrel section and formation of another piece of pipe is begun. The length of travel of carriage 4 and the speed of the conveyor are designed to provide sufficient time for the operator to change mandrels before the carriage reaches its maximum height. For example, if the speed is two feet per second and six seconds are allotted for a mandrel change the carriage must travel to accommodate twelve feet of felt fed from the cylinder mold 7. Similarly, the storage festoon ahead of the cylinder mold section must be able to accommodate twelve additional feet of felt during the roll-up period. Control means in the form of a limit switch or other device, described subsequently, may also be provided to stop the entire machine should the roll-up section be stopped for a period in excess of the allotted time. Moreover, automatic means for changing mandrels may be employed.

Rolls 11 and 26 are driven at a set speed in excess of that of the cylinder molds so that the felt conveyor element exerts pressure against the counterweight 13 to gradually return the carriage to its initial position shown in full lines in the drawing. The speed of the rolls 11 and 26 is set relative to that of the cylinder mold so that the carriage will have returned to its full line position at the time that the pipe is rolled up on the mandrel.

In order to drive the conveyor and to prevent the accumulating carriage from moving beyond the extreme limits shown in full and dot-dash lines in FIGURE 1 due to inattention of the operator or malfunction of the apparatus, I provide the control means such as that illustrated in the schematic shown in FIGURE 4.

A D.C. power source provides current to drive D.C motors 104 and 105. Starter 101 of conventional construction controls the supply of power to motors 104 and 105. Motor 104 drives drums 26 and 11 in synchronism. The cylinder molds are driven by the motor 105. A second starter 108 is placed in series with the motor 104 so that this motor may be started and stopped by the operator independently of the motor 105.

A speed control rheostat 106 is connected in series with the motor 105 so that the motor may be set at a preselected speed with respect to the motor 104. Speed is varied in accordance with the size of pipe to be manufactured, and is set with respect to the speed of motor 104 so that the carriage will move from the upper position to the full line position when the pipe is rolled up on the mandrel. A normally open limit switch LS2 is connected to bypass the speed control rheostat 106. In the event that the carriage should move down to position in which it closes the limit switch LS2, the rheostat 106 is bypassed so that motor 105 will drive the cylinder molds at the same speed as the motor 104 drives rolls 26 and 11. Thus further downward movement of the carriage is prevented.

The main starter 101 is provided in order to enable the operator to stop and start the two motors. Limit switch LS1 is connected to this starter to break the circuit and is located so that it will be actuated by the carriage in the event that the carriage rises beyond the extreme upper position. Speed control rheostat 103 is manually adjustable by the operator to control the over-all speed of the apparatus.

FIGURE 2 illustrates a second embodiment of the invention, similar in operation to that of FIGURE 1 but in which the conveyor is comprised of two separate conveyor belts 31 and 32 instead of one.

In the embodiment of FIGURE 2, the first belt 31 operates only in the vicinity of the cylinder molds 33 and 34. As in the first embodiment, the cylinder molds 33 and 34 are continuously rotated. Rolls 35 and 36 are driven in synchronism by a variable speed drive means operating independently of the cylinder molds.

A suction device 37 to remove water from the web and a blower 38 to separate the web from the belt are provided, causing it to drop down onto the belt 32 adjacent the roller 59 when the belt 32 passes around the roller 59. Since the belt 32 never passes through the vats 33 and 34, it is maintained in a relatively dry state. This means that the roll-up speed may be substantially increased, since, as discussed above, excess water in the felt is a prime factor in limiting roll-up speed. Furthermore, since the felt does not come into contact with the web in its extreme wet state, it will stay clean for a much longer period of time, preserving its permeability and sponge-like characteristics. Greater speeds, longer felt life and the use of thicker webs are possible with this embodiment. With this two-felt arrangement, it is also possible to use materials for the second conveyor element which are much more permeable than the felt used heretofore. Woven wire or plastic screening, or open-mesh cloth may be employed which will further increase the water removal rate at the mandrel roll-up station.

Felt conveyor element 31 returns to the vat or cylinder mold section of the apparatus via a guide roll 40 and a storage festoon 41 which is comprised of suspended vertically movable rolls 42, 43 and fixed rolls 44 and 45. The festoon stores the excess felt in the system whenever the carriage 31a is out of the dotted line position shown in FIGURE 2. A shower 46, suction box 47 and other conventional cleaning devices are located intermediate the mandrel roll-up station and the cylinder molds to clean and partially dry the felt before application of the web.

Felt 32 receives the web from felt 31 and conveys it over the guide roll 49 to the roll-up section of the machine. Suitable suction devices 48 draw the web to the felt at the point of transfer and transfer some of the moisture into the felt. The web is rolled up on a mandrel 50. Counterpress rolls 51 and 52 are urged into engagement with the mandrel by pressure means such as pneumatic or hydraulic cylinder 53.

Showers 54 and a beater 55 are located in the return portion of the path to clean the felt 32. Roller 57 is suspended and vertically movable to maintain a uniform tension on the felt. Rolls 58 and 59 are pressurized to remove the water from the felt.

As in the first embodiment, rolls 35 and 36 are driven independently of the cylinder mold drive means through control circuitry illustrated in FIGURE 4 and described above. When these rolls are stopped to effect a mandrel change, the excess felt in the storage festoon 41 is fed past the cylinder molds and carriage 31a begins to rise, maintaining tension on the felt. When the fresh mandrel is in place, the speed of rolls 35 and 36 is such that the carriage returns to its initial full line position at the end of the pipe-making cycle.

FIGURE 3 illustrates still another form of the invention, generally similar in operation to the embodiments of FIGURES 1 and 2. In FIGURE 3, felt conveyor element 60 travels in a closed circuit between the vat section 61 and the rotating mandrel 69 of the apparatus. The conveyor element picks up a thin layer of the material as it passes between the continuously rotating cylinder mold 61a and a couch roll 62. The take-up or accumulating means in this embodiment comprises a roll 63 slidably mounted in a guide track 64. Counter-balancing means diagrammatically illustrated by the weight 65 causes the roll 63 to constantly exert a pressure on the inner side of the conveyor element 60.

To the left of the take-up means as shown in FIGURE 3, a guide roll 66 is provided. Suction device 67 is located beneath the belt to remove moisture from the web of material before it reaches the rotating mandrel 69. The mandrel is located between the discontinuously operatable drive roller 68 and counterpress rolls 70. Pneumatic or hydraulic cylinder 71 urges the counterpress rolls 70 into engagement with the mandrel 69. In the return run of the conveyor element guide, rolls 72 and 73 are provided to guide the felt past a beater 74 or other cleaning device. A storage festoon 75 is located intermediate the beater 74 and the vat section 61. The festoon includes fixed guide rollers 76 and suspended rollers 78 and stores the excess felt in the system during the roll-up operation.

Control circuitry such as that shown in FIGURE 4 and described above is used to drive and control the apparatus.

When a pipe rolling operation is completed and the operator desires to substitute a fresh mandrel, the discontinuously operatable roller 68 is stopped while the cylinder mold 61a continues to rotate. The felt in the storage festoon 75 is fed past the cylinder mold to the accumulating means. Counter-balance means 65 causes the roller 63 to move outwardly along the track 64 extending the path of travel of the web-carrying portion of the conveyor element. Track 64 is of sufficient length to give the operator time to substitute a fresh mandrel.

From the foregoing description, it may be seen that each of the embodiments of the present invention provides highly efficient apparatus for continuously forming a web from a slurry of fibrous material. This continuous operation, as permitted by the apparatus of the present invention, produces a web of consistently high quality. The accumulating loop, common to each of the embodiments of FIGURES 1–3 of the invention, produces a web of uniform thickness, good fiber dispersion and eliminates waste of material during the mandrel change time. The embodiments of FIGURES 1 and 2 possess an additional advantage in that the conveyor element which supports the web in the region of the rotating mandrel may be maintained in a much dryer state than was heretofore possible in prior art apparatus. The embodiment of FIGURE 1 achieves this result through a unique arrangement which requires only one conveyor element. The embodiment of FIGURE 2 achieves additional benefits as the second felt can be maintained in a cleaner condition. Moreover, it can be entirely replaced with highly permeable material such as woven wire screen.

I claim:

1. In a machine for making pipe from a fiber containing slurry by forming a web of fibers and winding the web on a rotating mandrel comprising;
    mandrel drive mechanism adapted to sequentially receive and rotate a plurality of mandrels;
    mechanism for continuously forming a web of fibers from said slurry;
    a conveyor for transferring the fiber web from the web-forming mechanism to the mandrels;
    drive mechanism for the conveyor including continuously operatable means for driving the conveyor in the region where the conveyor receives the fiber web from the web-forming mechanism and further including discontinuously operatable means for driving the fiber web carrying conveyor in the region of the mandrels to provide for cessation of web feed during change of mandrels;
    and a slack accumulator for the conveyor located along the path of travel of the conveyor at a point between the continuous and the discontinuous drive means.

2. Apparatus according to claim 1 in which the conveyor comprises a single endless conveyor element, one run of which extends from the web-forming mechanism to the pipe forming mandrel and therefrom back to the web-forming mechanism.

3. Apparatus according to claim 1 wherein the conveyor includes two endless conveyor elements, the first of said conveyor elements transferring said web from said web-forming mechanism to the second conveyor element, the second conveyor element transferring the web to the mandrels, the apparatus further including an additional driving means operatable in synchronization with said discontinuously operatable drive means for driving said first conveyor element in the region of web transfer, said slack accumulator being located between the continuous drive means and the additional drive means.

4. Apparatus according to claim 3 wherein the second conveyor element is an open mesh screening material.

5. Apparatus according to claim 1 wherein the conveyor includes an endless conveyor element traveling in a closed circuit, one run of which receives the fiber web from the forming mechanism, together with means for varying the length of the return run of said conveyor element from a maximum length during normal simultaneous operation of said drive mechanisms to a minimum length when said discontinuous drive means is stopped independently of said continuously operatable drive means during a mandrel change.

6. Apparatus according to claim 1 wherein said discontinuous drive mechanism includes a variable speed mechanism capable of advancing said conveyor at a speed in excess of that of the continuously operatable drive mechanism.

7. Apparatus according to claim 5 in which the closed circuit of said conveyor element supports the web throughout the entire portion of the circuit which extends from said web-forming mechanism to said mandrel.

8. Apparatus according to claim 1 in which said conveyor includes a first endless conveyor element traveling in a closed circuit;
    and a second endless conveyor element traveling in a closed circuit, said first element located so as to receive a web of material from said web-forming mechanism and for transfer of the web to said second element, said second element located so as to transfer the web received from said first element to said mandrel;
    said continuously operatable drive means driving said first element in the region of said web-forming mechanism;
    said discontinuously operatable drive means comprising a rotative drive member engaging said first conveyor element in the region of transfer to the second conveyor element and a rotative member synchronously driven with the first drive member and engaging the second conveyor element.

9. Apparatus according to claim 1 wherein said conveyor means comprises a flexible conveyor element extending from said web-forming mechanism to said mandrel;
    a portion of the conveyor path intermediate the slack accumulator and the mandrel defining a loop;
    means to cause the web of material carried by the conveyor to bypass the loop;
    and means to remove moisture from the portion of said conveyor element in said loop.

10. In a conveyor for transferring material from a first to a second material transfer station including an endless flexible conveyor element adapted to travel in an endless path;
    mechanism for driving the conveyor in its endless path including a continuously operatable conveyor drive means in the region of said first station;
    the drive mechanism further including intermittently operatable conveyor drive means in the region of said second station;
    take-up means to extend the path of travel of said conveyor element in the run thereof from the first station to the second station;
    and means connected to said take-up means to cause said take-up means to extend the path of travel of the conveyor element, when said discontinuously operatable means is stopped independently of said continuously operating drive means.

11. Apparatus according to claim 1 in which said accumulating means comprises a guide track, a take-up roll slidably mounted in said guide track, and force-applying mechanism connected to said movable take-up roll and operatable to cause said roll to bear against the conveyor element.

12. Apparatus according to claim 1 in which said accumulating means comprises a carriage pivotally mounted in the region adjacent the web-carrying portion of said conveyor element, said carriage having a free end bearing on the conveyor element, and force-applying mechanism connected to said carriage to cause said carriage to pivot to accumulate the conveyor element fed by said continuously operatable drive mechanism when said discontinuous drive mechanism is stopped to effect a mandrel change.

13. Apparatus according to claim 1, said slack accumulator normally movable within a range from a first to a second operating position during said roll-up operation, control means operatable in the event said slack accumulator moves out of said range beyond said first operating position, and circuitry under control of said control means to stop said continuously operatable drive means.

14. Apparatus according to claim 1, said slack accumulator normally movable within a range from a first to a second operating position during said roll-up operation, control means operatable in the event said slack accumulator moves out of said range beyond said second operating position, and circuitry under control of said control means to synchronize the speed of said first and second drive means.

References Cited by the Examiner
UNITED STATES PATENTS

| | | | |
|---|---|---|---|
| 1,651,407 | 12/27 | Parker | 162—284 |
| 2,102,453 | 12/37 | Benner et al. | 226—104 |
| 2,789,333 | 4/57 | Fuhrmann | 198—208 |
| 2,858,934 | 11/58 | Carlson et al. | 198—208 |

DONALL H. SYLVESTER, *Primary Examiner.*

MORRIS O. WOLK, *Examiner.*